United States Patent [19]

Stürmer

[11] 4,041,323

[45] Aug. 9, 1977

[54] NON-LINEAR OPTICAL FREQUENCY DOUBLING DEVICES

[75] Inventor: Wilhelm Stürmer, Erlangen, Germany

[73] Assignee: Siemens Aktiengesellschaft, Munich, Germany

[21] Appl. No.: 616,679

[22] Filed: Sept. 25, 1975

Related U.S. Application Data

[63] Continuation of Ser. No. 124,675, March 16, 1971, abandoned.

[30] Foreign Application Priority Data

Mar. 20, 1970 Germany ............................ 2013315

[51] Int. Cl.² ............................ G02F 1/37; G02F 1/39
[52] U.S. Cl. .............................. 307/88.3; 331/94.5 N; 423/366
[58] Field of Search ...................... 423/366; 307/88.3; 331/94.5 N

[56] References Cited

U.S. PATENT DOCUMENTS 3,371,265  2/1968  Woodbury et al. ........ 331/94.5 N X
3,840,347  10/1974  Grabmaier et al. ............. 423/366 X

OTHER PUBLICATIONS

Tramer "Chem. Abstracts", vol. 57, 296a, 1962.
Masakatsu et al. "Chem. Abstracts", vol. 69, 90932g 1968.
Williams "Cyanogen Compounds", 1948 pp. 294–295.

*Primary Examiner*—Jack Cooper
*Attorney, Agent, or Firm*—Allison C. Collard

[57] ABSTRACT

A non-linear optical frequency doubling device comprised of a laser means producing infrared light and crystal optically connected therewith for receiving such light and doubling the frequency thereof. The crystal is composed of $M[Hg(SCN)_4]$ wherein M is selected from the group consisting of Cd and Zn.

2 Claims, 2 Drawing Figures

NON-LINEAR OPTICAL FREQUENCY DOUBLING DEVICES

This is a continuation of patent application, Ser. No. 124,675, filed Mar. 16, 1971, now abandoned.

This invention relates to crystals for frequency changes in the field of non-linear optics and a method of making them.

Crystals of this type are of particular interest for changing the frequency of laser light. This effect is based upon procedures and changes in the condition of matter at extremely high energy accumulation, and is particularly advantageous since the extent of efficiency of the transformation, such as the doubling of frequency, is very high and amounts to at least 20%. A substance which has this property is, for example, a crystal of ammonium dihydrogenphosphate which, for example, receives upon one side an incoming red laser light while upon its other side emits a blue coherent light with a double frequency.

An object of the present invention is to improve crystals of this type.

Other objects will become apparent in the course of the following specification.

In accordance with the present invention improved transformation results are produced when the crystal is a compound having a thiocyanate complex in the anion portion thereof. As is known, such compounds have a high refraction index and are at least double refracting, as, for example, the thiocyanates of copper, silver, gold, zinc, cadmium and mercury, namely, the salts of the metals of Groups I and II of the periodic system of elements. Double salts containing two metals, particularly those of Groups I and II, such as zinc or cadmium-mercury-thiocyanate, or copper-mercury-thiocyanate respectively having the formulas $Zn[Hg(SCN)_4]$, $Cd[Hg(SCN)_4]$ or $Cu[Hg(SCN)_4]$ have also produced high ray transformation rates. Thus an anion containing a thiocyanate complex also includes anions which contains a metal, such as mercury, and which substantially corresponds to the formula $[Hg(SCN)_4]$.

Crystals of this type can be produced from a gel, particularly silica-gel, for example, formed of a mixture of equal parts of potassium silicate having a density of 1.06 and in. acetic acid, wherein crystal components are brought into such gel and react to form the desired crystal. This method is successfully used to produce large crystals from compounds which are soluble with great difficulty and during usual precipitation procedures only yield fine crystals. By way of example, the first step of the process consists of the formation of the gel from a solution which contains one component of the crystal. The other crystal component is then brought for diffusion into the gel by overlaying the gel with an aqueous solution which contains this other component. However, the introduction can also be carried out from a solution with other solvents or from a gas phase.

The invention will appear more clearly from the following detailed description when taken in connection with the accompanying drawing showing by way of example only, a preferred embodiment of the invention.

Figure 1:
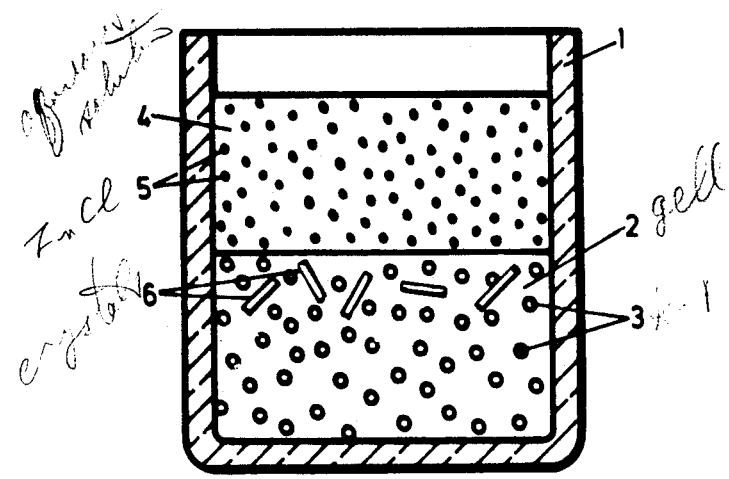
FIG. 1 is a diagrammatic sectional view illustrating a device for producing the crystals of the present invention.

FIG. 1 shows a glass container 1 wherein, for example, freshly formulated silica gel 2 is produced in the above-described manner for the making of zinc-mercury-thiocyanate of the formula $Zn[Hg(SCN)_4]$. The gel is then treated with ammonium mercury thiocyanate 3, whereby at least about 0.1g. of thiocyanate is brought into contact with 1 cc of the gel 2. Then a two-molar aqueous solution 4, containing zinc chloride 5 is placed on top of the so-treated gel 2. This arrangement can then remain standing as it is, and whereby after a few days crystals 6 are formed having a length of 1 cm and a cross-section of 1 mm². The crystals 6 grow in the gel 2 since zinc ions wander from the solution 4 of zinc chloride 5 to the mercury thiocyanate ions of the ammonium salt 3.

Figure 2:
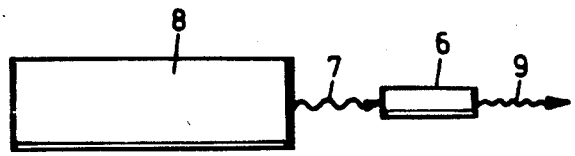
FIG. 2 is an elevated somewhat schematic view illustrating the use of a crystal in a laser device.

The crystals 6 which are thus produced emit, for example, the radiation indicated diagrammatically in FIG. 2. The crystals 6 are positioned so as to receive, for example, from a neodymium laser 8 infra red light of 1.06 $\mu$ indicated symbolically by a wavy line 7 and emit a light of double frequency (0.53$\mu$), the color of which is in the green range which is indicated symbolically by a line 9 having more waves than the line 7.

I claim:

1. A frequency-doubling non-linear optical device comprising a laser means producing infrared light and a crystal optically connected therewith for receiving said light and doubling the frequency thereof, said crystal being composed of a material corresponding to the formula $M[Hg(SCN)_4]$ wherein M is selected from the group consisting of Cd and Zn.

2. A frequency doubling non-linear optical device comprising a laser means producing infrared light of 1.06$\mu$ and a crystal optically connected therewith for receiving said light and converting the frequency thereof to 0.53$\mu$, said crystal being composed of a material corresponding to the formula $M[Hg(SCN)_4]$ wherein M is selected from the group consisting of Cd and Zn.

* * * * *